Nov. 27, 1934.   E. M. BOSS   1,982,568
PROTECTED FILLING DEVICE
Filed Nov. 1, 1933
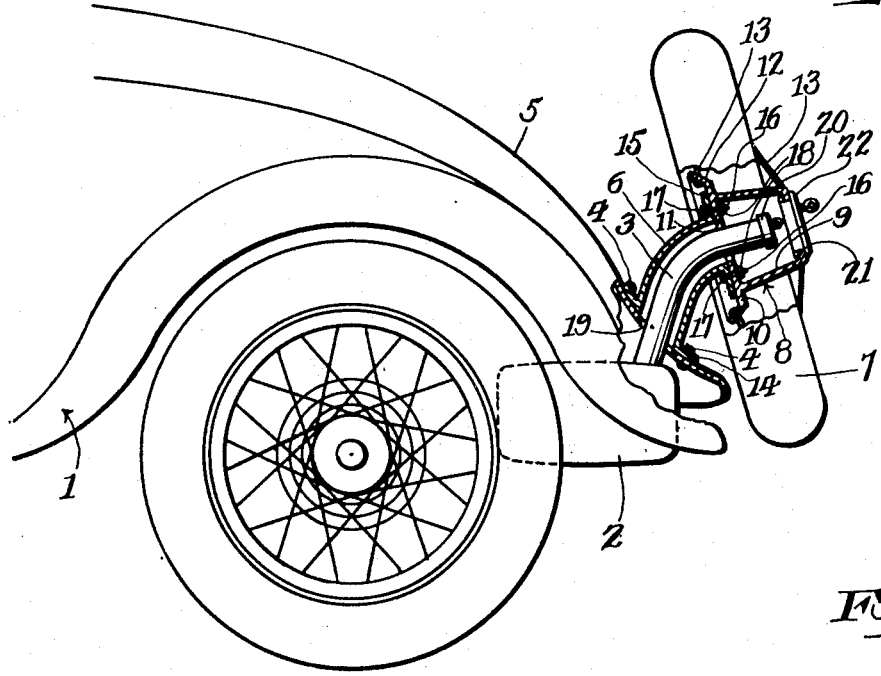
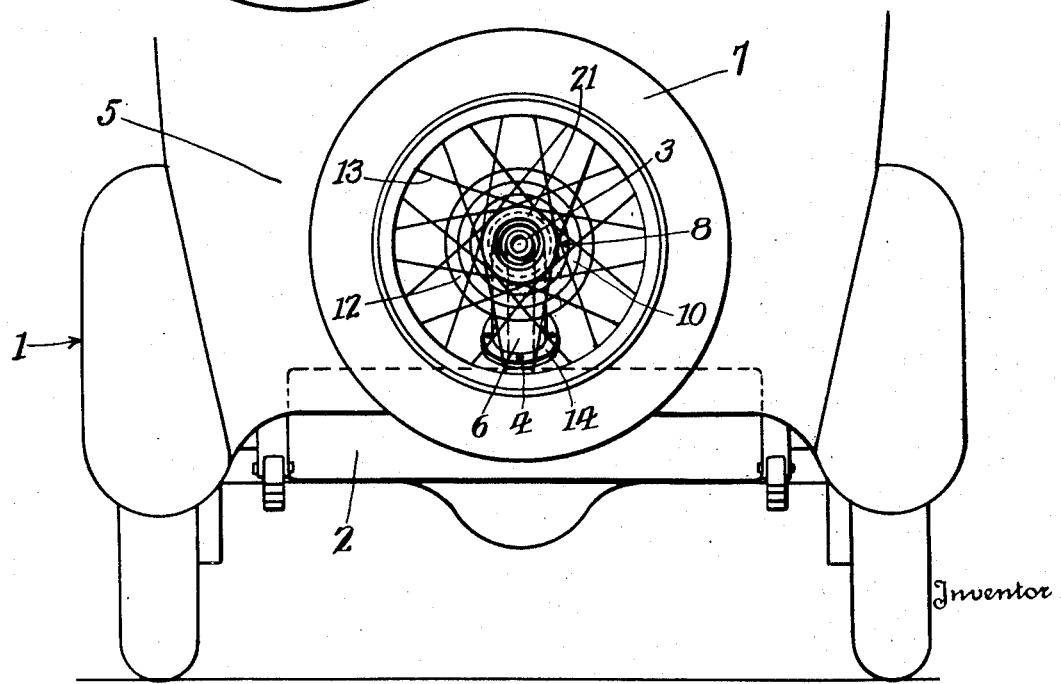
Inventor
Elvis M. Boss
By Geo. P. Kimmel
Attorney Patented Nov. 27, 1934

1,982,568

UNITED STATES PATENT OFFICE 1,982,568

PROTECTED FILLING DEVICE

Elvis M. Boss, Brownstown, Ind.

Application November 1, 1933, Serial No. 696,270

4 Claims. (Cl. 224—29)

This invention relates to a protected filling device for the fuel tanks of motor vehicles, and has for its object to provide, in a manner as hereinafter set forth, a device of the class referred to including a concealed and protected fuel conducting or filling pipe leading to the fuel tank of the vehicle.

A further object of the invention is to provide, in a manner as hereinafter set forth, a device of the class referred to including as a part thereof of a spare wheel bracket, the hub of the spare wheel and a fuel conducting or filling pipe leading to the fuel tank of the vehicle from within said hub, and with the bracket constructed in a manner and arranged relatively to the pipe and coacting with the wheel hub for concealing, protecting and preventing access to the pipe surreptitiously.

A further object of the invention is to provide, in a manner as hereinafter set forth, a device of the class referred to including a fuel conducting or filling pipe having the outer end portion thereof completely concealed, protected from injury and arranged in a manner to prevent access to its intake end by a surreptitious person.

A further object of the invention is to provide, a protected filler device for fuel tanks constructed and arranged in a manner to reduce the number of obstructions in the stream line of the vehicle at the rear of the latter.

A further object of the invention is to provide, in a manner as hereinafter set forth, a filling device for the purpose set forth including a fuel conducting or filling pipe having its intake end completely concealed, protected from damage and prevented from access thereto surreptitiously by the hub of a spare wheel and the lock or closure cap for the hub.

A further object of the invention is to provide, in a manner as hereinafter set forth, a protected filler device for the fuel tank of an automobile including a protected fuel conducting or filling pipe of angular contour having a normally closed intake end concealed and prevented from being tampered with or opened surreptitiously.

A further object of the invention is to provide, in a manner as hereinafter set forth, a protected filler device for the purpose referred to so constructed and arranged as to prevent access to its intake by an unauthorized person.

To the above ends essentially and to others which may hereinafter appear, the invention consists of such parts, and such combination of parts which fall within the scope of the invention as claimed.

In the drawing:

Figure 1 is a fragmentary view in side elevation of the rear end of a motor vehicle showing the adaptation therewith of the protected filler device, and with the latter illustrated in vertical section.

Figure 2 is a rear elevation of a motor vehicle having the protected filler device installed therewith, the locking cap for the hub of the spare wheel and closure cap for the fuel conducting or filling pipe being removed.

In the drawing, the rear portion of a motor vehicle is indicated at 1 and a fuel tank at 2.

Connected to and communicating with the tank 2 is an upstanding rearwardly directed fuel conducting or filling pipe 3 therefor. The pipe 3 is of angled contour. Anchored by the holdfast devices 4 to the rear end of the body 5 of the vehicle is an upstanding curved rearwardly directed tubular bracket 6 for suspendingly supporting a spare wheel 7 including a hub 8 formed of a tapered tubular body part 9 provided at its inner end with a circular disc 10 of greater diameter than the latter. The disc 10 is concentrically arranged with respect to body part 9 and is formed with an axial opening 11 of less diameter than body part 9, but of greater diameter than and through which passes pipe 3 into the hub 8. The disc 10 is also provided with a rearwardly directed flared annular flange 12 to which certain of the spokes 13 of the wheel 7 are secured. The other spokes 13 are secured with the outer end of body part 9.

The bracket 6 has its rear or inner end formed with an outwardly directed annular flange 14, for the passage of the holdfast devices 4 to secure the bracket 6 to the body 5. The outer end of the bracket 6 abuts the disc 10, encompasses the opening 11 and is formed with an outwardly directed annular flange 15. Extending through the latter and also through disc 10 are a plurality of bolts 16 of a length to project into the body part 9 of hub 8. The heads 17 of the bolts 16 abut against the outer face of flange 15. The ends of the bolts 16 within the body part 9 of hub 8 carry removable securing nuts 18, which in connection with the disc 10 and heads 17 of the bolts 16 and flange 15 detachably connect wheel 7 to bracket 6 at the upper end of the latter.

The body 5 of the motor vehicle is formed with an opening 19 which is surrounded by the inner or lower end of bracket 6. The pipe 3 is of a length to extend from tank 2 to within the body part 9 of hub 6 to a point inwardly of the outer end of the latter. The pipe 3 passes through bracket 6, the latter concealing and protecting the major portion of the former. The upper or outer end portion of pipe 3 is concealed and protected by the body part of hub 8.

The intake end of pipe 3 is closed by a closure cap 20 which may or may not be of the locking type, and is shown by way of example as a cap of the locking type. The outer end of body part 9 of hub 8 is formed with an inwardly extending annular flange 21 which coacts with a lock cap 22. The purpose of the cap 22 is to prevent access to the interior of the hub 8 by a surreptitious person to remove the spare wheel 7, as well as preventing access to the intake end of pipe 3.

The bracket conceals and protects the major portion of the pipe 3 from damage. The body part 9 of hub 8 conceals and protects the upper or outer end portion of the pipe 3 from damage. The body part 9 of hub 8 and lock cap 22 prevent an unauthorized person from tampering with the intake end of pipe 3 to remove cap 20.

The construction as referred to provides a fuel tank filling device which can be locked by the same lock which is employed to lock the spare wheel to prevent theft, as well as substantially completely concealing and protecting the fuel conducting or filling pipe leading to the tank. The arrangement further provides for the reduction of the number of obstructions in the stream line of the vehicle at the rear of the latter as pipe 3 is arranged within bracket 6, as formerly the pipe was spaced from the bracket.

What I claim is:—

1. In combination, a tubular supporting bracket, a spare wheel hub removably connected to the outer end of the bracket, a lock cap for the hub, and a fuel conducting or filling pipe for a fuel tank, said pipe extending through said bracket and into the said hub, and having its intake end positioned in the latter, said bracket and hub constituting a protecting and enclosing means for said pipe, and said cap preventing the surreptitious removal of the wheel and surreptitious access to the intake end of said pipe.

2. In combination, a fuel tank for motor vehicles adapted to be supported below the rear end of the body of the vehicle, an upstanding and rearwardly directed filling pipe for and having its lower end connected to the tank and adapted to extend upwardly through the rear end of said body, a tubular upstanding and rearwardly directed supporting bracket adapted to have its lower end anchored to said rear end, said bracket encompassing and protecting the major portion of that part of said pipe extended from said body, a spare wheel hub positioned against the outer end of said bracket for encompassing and protecting the intake end and the remaining portion of that part of said pipe extended from said body, means extending in said hub for detachably connecting said hub to the bracket, and means for connection to said hub and common to said connecting means and intake end of said pipe to prevent surreptitious access to the intake end of the pipe and removal of the hub from said bracket.

3. In combination, a fuel tank within a vehicle body, a tubular spare wheel support anchored to said body, a spare wheel hub detachably connected at its inner end to the outer end of said support, a filling tube extending upwardly from said tank and vehicle body, through said support and into said hub, said support and hub completely encompassing and providing a protection for that portion of the pipe extended from the vehicle body, and a lock cap for the outer end of said hub for simultaneously preventing surreptitious access to the outer end of the tube and the detaching of the hub from said support.

4. In combination, the rear portion of the body of a vehicle, a fuel tank arranged below said portion, the latter being formed with an opening, an upstanding tubular support anchored to said portion and registering with said opening, a spare wheel hub detachably connected at its inner end to the outer end of said support, an upstanding filling tube extending from the said tank, through said opening and support and into said hub, said support and hub encompassing and providing a protector for that portion of the tube extended from said opening, and a lock cap for the outer end of said hub for simultaneously preventing surreptitious access to the outer end of the tube and the detaching of the hub.

ELVIS M. BOSS.